US012378935B2

(12) United States Patent
Garland et al.

(10) Patent No.: US 12,378,935 B2
(45) Date of Patent: Aug. 5, 2025

(54) FUEL PUMP

(71) Applicant: DELPHI TECHNOLOGIES IP LIMITED, St. Michael (BB)

(72) Inventors: Paul F. Garland, Gillingham Kent (GB); Toby Pedley, London (GB)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/030,817

(22) PCT Filed: Oct. 6, 2021

(86) PCT No.: PCT/EP2021/077623
§ 371 (c)(1),
(2) Date: Apr. 7, 2023

(87) PCT Pub. No.: WO2022/074082
PCT Pub. Date: Apr. 14, 2022

(65) Prior Publication Data
US 2023/0383716 A1 Nov. 30, 2023

(30) Foreign Application Priority Data
Oct. 7, 2020 (GB) ...................................... 2015900

(51) Int. Cl.
*F02M 59/46* (2006.01)
*F02M 59/44* (2006.01)

(52) U.S. Cl.
CPC ........ *F02M 59/464* (2013.01); *F02M 59/442* (2013.01)

(58) Field of Classification Search
CPC ...... F02M 61/16; F02M 59/44; F02M 59/442; F02M 59/46; F02M 59/464; F04B 53/14
See application file for complete search history.

(56) References Cited

U.S. PATENT DOCUMENTS 5,358,383 A 10/1994 Eisenbacher et al.
5,706,786 A * 1/1998 Stephanus .............. F02M 61/14 123/470

(Continued)

FOREIGN PATENT DOCUMENTS

DE 102013203141 A1 * 8/2014 ........... F02M 59/464
GB 2269209 A 2/1994

(Continued)

OTHER PUBLICATIONS

DE 202013203141A1 English Translation Version.*

(Continued)

*Primary Examiner* — Hai H Huynh
*Assistant Examiner* — Johnny H Hoang
(74) *Attorney, Agent, or Firm* — WARNER NORCROSS + JUDD LLP

(57) ABSTRACT

A pump for a fuel delivery system comprises a main housing and a plunger housing arranged to couple to the main housing so as to define a compression chamber therebetween. The main housing and the plunger housing comprise respective first and second opposed faces which are arranged to form a seal therebetween. The main housing comprises a projecting portion which projects from the first face of the main housing through an opening in the second face of the plunger housing into a plunger bore.

15 Claims, 4 Drawing Sheets

(56) References Cited

U.S. PATENT DOCUMENTS

| | | | | |
|---|---|---|---|---|
| 6,179,581 | B1 * | 1/2001 | Schnittger | F04C 15/0073 417/302 |
| 6,205,980 | B1 * | 3/2001 | Spinnler | F02M 59/102 123/495 |
| 6,289,876 | B1 * | 9/2001 | Mackert | F02M 57/025 123/470 |
| 2001/0043874 | A1 * | 11/2001 | Sano | F04B 53/04 417/470 |
| 2007/0128058 | A1 * | 6/2007 | Kitamura | F04B 1/0404 417/437 |
| 2012/0255433 | A1 * | 10/2012 | Hopley | F02M 59/48 91/418 |
| 2020/0208597 | A1 * | 7/2020 | Corizzo | F02M 59/027 |

FOREIGN PATENT DOCUMENTS

| | | | |
|---|---|---|---|
| GB | 2563263 | A | 12/2018 |
| WO | 2019166154 | A1 | 9/2019 |

OTHER PUBLICATIONS

International Search Report for PCT/EP2021/077623 dated Jan. 4, 2022, 3 pages.

Machine assisted English translation of WO2019166154A1 obtained from https://patents.google.com/patent on Apr. 7, 2023, 6 pages.

* cited by examiner

FUEL PUMP

CROSS-REFERENCE TO RELATED APPLICATIONS

This application is the U.S. National Stage of International Application No. PCT/EP2021/077623 filed on 6 Oct. 2021, which claims priority to and all advantages of United Kingdom Application No. 2015900.0 filed on 7 Oct. 2020, the contents of which are incorporated herein by reference.

FIELD OF INVENTION

The invention relates to a pump for use in a fuel delivery system. Aspects of the invention relate to a pump and a fuel delivery system for an automotive vehicle comprising a pump.

BACKGROUND

In combustion engine systems, a fuel pump is used to pressurise fuel before it is injected into the cylinders of the engine. Modern compression-ignition engine systems use a high-pressure fuel pump to feed a common rail fuel volume which acts as a reservoir to store the pressurised fuel and feed the individual fuel injectors. In compression-ignition internal engines the fuel is pressurised to very high levels, typically in excess of 2000 bar. Such high pressures are difficult to manage and engine designers have to pay careful attention to controlling fuel leakages within the engine to guard against system inefficiency, as well as damage to parts.

It is against this background that the invention has been devised.

STATEMENTS OF INVENTION

An aspect of the invention provides a pump for a fuel delivery system, the pump comprising:

- a main housing and a plunger housing arranged to couple to the main housing so as to define a compression chamber therebetween,
- the main housing and the plunger housing comprising respective first and second opposed faces which are arranged to form a seal therebetween;
- wherein the main housing comprises a projecting portion which projects from the first face of the main housing through an opening in the second face of the plunger housing into a plunger bore.

Accordingly, embodiments of the invention advantageously provide a pump in which a projecting portion of the main housing projects into a plunger bore of the plunger housing, which necessarily limits the topmost position of a plunger within the plunger bore. Thus, the topmost position of the plunger within the plunger bore is necessarily spaced further away from the point at which the main housing and the plunger housing seal against one another. This is beneficial because it may reduce the likelihood of a plunger becoming stuck or seized within the plunger bore due to distortions of the plunger bore caused when the main housing and the plunger housing are sealed together. At the same time, the projecting portion may advantageously have a size and shape such that it occupies a dead volume within the compression chamber so as to preserve the volumetric efficiency of the pump.

The main housing may comprise an inlet valve for controlling the flow of fuel into the compression chamber, the inlet valve comprising a valve member arranged for reciprocating movement within a valve bore defined by the main housing. The valve bore may be formed, at least in part, in the projecting portion. The projecting portion may comprise a valve seat disposed at a distal end thereof, the valve member comprising a valve head arranged to close against the valve seat when the inlet valve is in a closed state.

The pump may comprise a plunger arranged for reciprocating movement within the plunger bore. The plunger may have a substantially cylindrical form and comprise a close clearance annular portion disposed toward an end of the plunger proximal to the second face of the plunger housing, wherein the close clearance annular portion serves to limit and/or substantially prevent fuel from leaking out of the compression chamber, in use. In one embodiment, the end of the plunger proximal to the second face of the plunger housing comprises a recess therein. The close clearance annular portion of the plunger may be disposed between said end of the plunger and a base of the recess.

The projecting portion may be a substantially cylindrical boss. The valve bore may be co-axial with the substantially cylindrical boss.

In an embodiment, the valve head projects away from the valve seat into the compression chamber.

In one embodiment, a surface of the projecting portion and an adjacent wall of the plunger bore define therebetween an outlet path for pressurised fuel from the compression chamber.

In use, at least a portion of the valve head may be received within the recess of the plunger during a pumping stroke of the plunger.

The first and/or the second face may comprise an annular seal which encircles the projecting portion. The first and second opposed faces may each extend substantially perpendicular to a main axis of the plunger bore.

The annular seal may be provided on the main housing and has a cross section which tapers towards contact with the plunger housing. For example, the annular seal may define a relatively narrow annular contact surface at its extremity which contacts the plunger housing.

The main housing and the plunger housing may be coupled to one another by threaded fastening means.

According to another aspect of the present invention, there is provided a fuel delivery system comprising a pump in accordance with any one of the preceding paragraphs.

It will be appreciated that preferred and/or optional features of each aspect of the invention may be incorporated alone or in appropriate combination in the other aspects of the invention also.

BRIEF DESCRIPTION OF THE DRAWINGS

Embodiments of the present invention will now be described, by way of example only, with reference to the accompanying drawings, in which.

Figure 1:
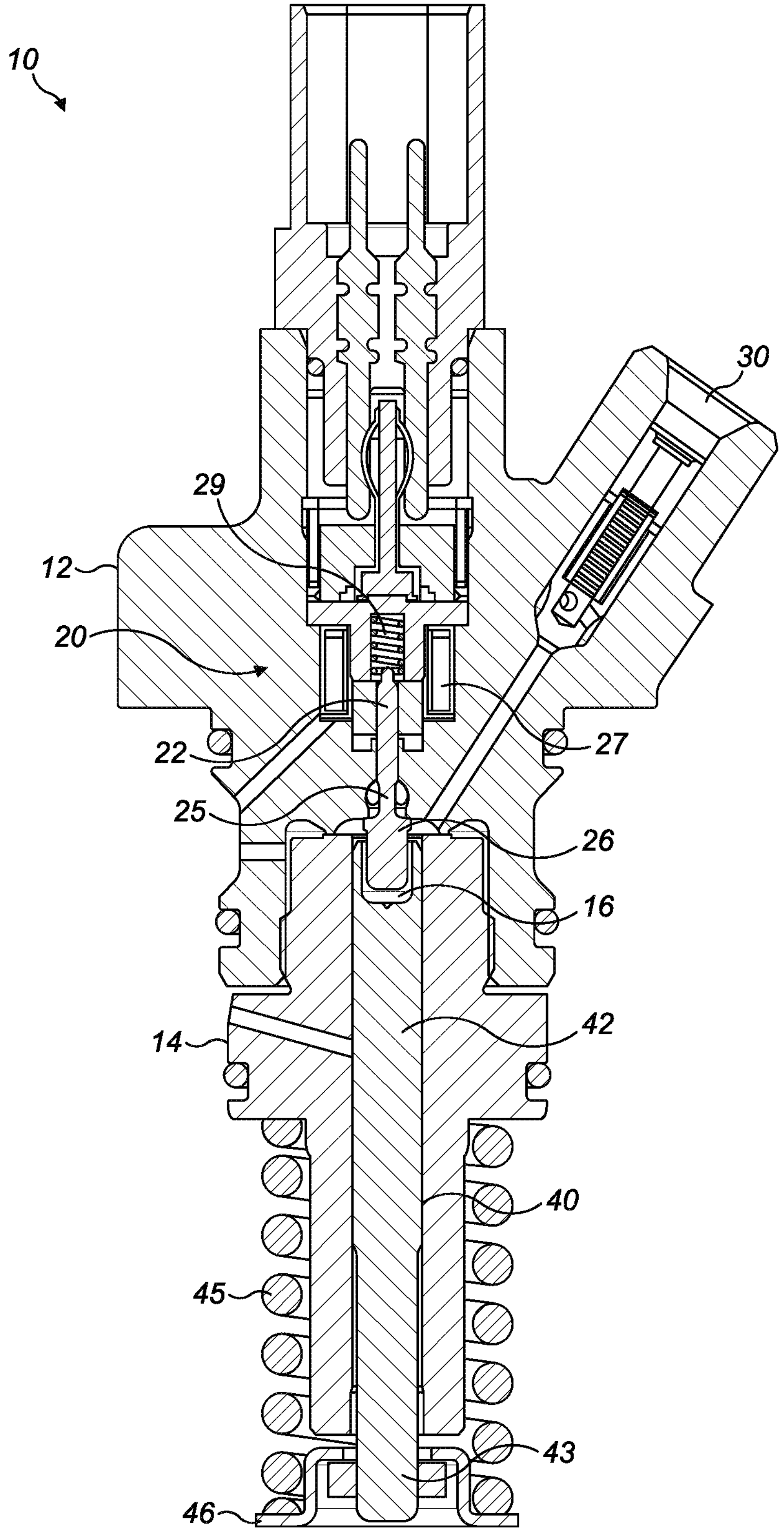
FIG. 1 Prior Art
FIG. 1 is a cross-sectional view of an example of a pump for use in understanding the present invention.

In the following description, directional or relative references such as 'upper', 'lower', 'above' and 'below', relate to the orientation of the features as illustrated in the drawings, but such references are not to be considered limiting. The skilled reader will appreciate that pumps in accordance with embodiments of the invention may be oriented differently to the manner depicted in the drawings in practice.

SPECIFIC DESCRIPTION

Figure 2:
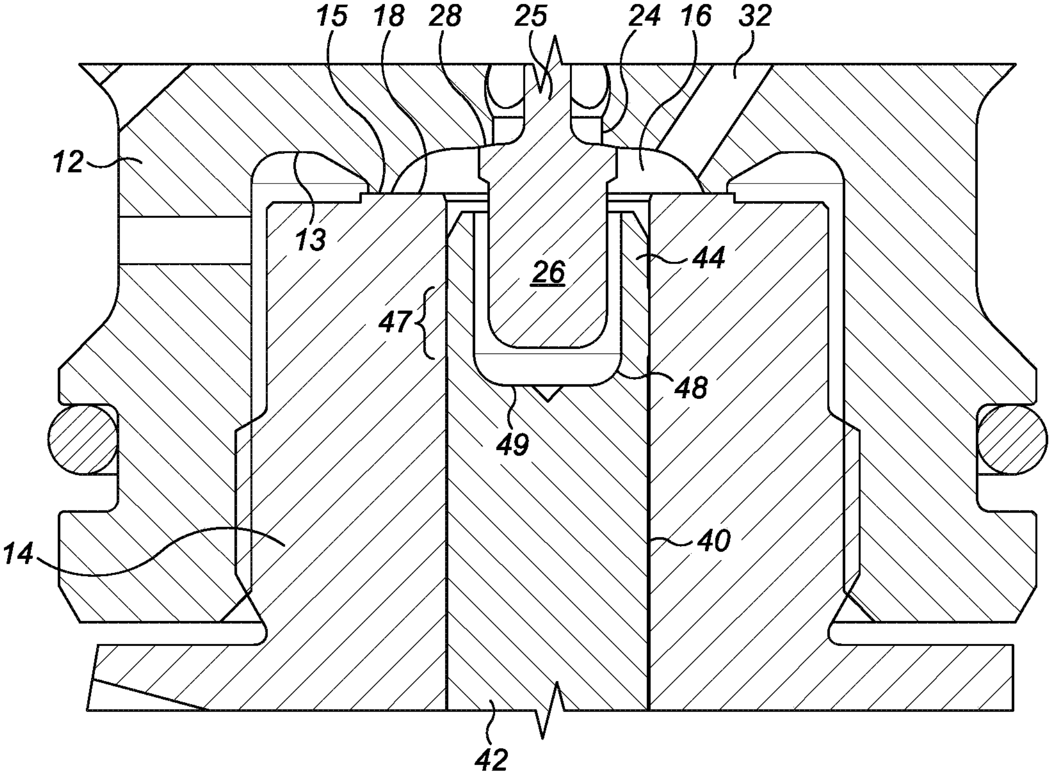
FIG. 2 Prior Art
FIG. 2 is an enlarged cross-sectional view of a compression chamber of the pump shown in FIG. 1.

Referring to FIGS. 1 and 2, an example of a pump 10 for use in a fuel delivery system generally comprises a main housing 12 and a plunger housing 14. The plunger housing 14 is coupled to the main housing 12, for example by threaded fastening means, so as to define a compression chamber 16 therebetween.

The main housing 12 comprises an inlet valve 20 and an outlet valve 30. The inlet valve 20 controls the flow of fuel into the compression chamber 16. The outlet valve 30 allows pressurised fuel to be conveyed from the compression chamber 16 to downstream components of the fuel delivery system, such as a common rail accumulator (not shown).

In more detail, the inlet valve 20 comprises a valve member 22 arranged for reciprocating movement within a valve bore 24 defined by the main housing 12. The valve member 22 comprises a valve stem 25 and a valve head 26. The valve head 26 projects into the compression chamber 16. The diameter of the valve head 26 is sized so as to be larger than the diameter of the valve bore 24 at a lower end thereof where it opens into the compression chamber 16. With this configuration, the lower opening of the valve bore 24 defines a valve seat 28. When the inlet valve 20 is in a closed state, the valve head 26 closes against the valve seat 28 so as to prevent the flow of fuel therepast. Movement of the inlet valve 22 is effected by means of an actuator 27 (e.g. a solenoid actuator) and a valve spring 29. The valve spring 29 is arranged so as to urge the valve head 26 away from the valve seat 28 toward an open position. When the pressure in the compression chamber 16 rises during a pumping stroke of the pump 10 this produces a force which acts against the valve spring 29. Closing of the inlet valve 20 can then be effected by energizing the solenoid actuator 27 to exert an additional closing force on the valve stem 25 which is sufficient to overcome the force of the valve spring 29 such that the valve head 26 closes against the valve seat 28.

The plunger housing 14 comprises an axial plunger bore 40 within which a plunger 42 is arranged for reciprocating movement therein. The plunger 42 is substantially cylindrical in shape. A lower end 43 of the plunger 42 is arranged, in use, to be in contact with an engine-driven cam (not shown). A plunger return spring 45 is disposed around the plunger housing 14. The return spring 45 abuts a shoulder of the plunger housing 14 at one end thereof and abuts a cap 46 affixed to the lower end 43 of the plunger 42 at the opposite end thereof.

The upper end 44 of the plunger 42 comprises a close clearance annular portion 47 having a larger diameter relative to the portions of the plunger 42 disposed immediately above and below the close clearance annular portion 47 in the axial direction of the plunger 42. The close clearance annular portion 47 is sized so as to be a close clearance fit with respect to the adjacent wall of the plunger bore 40. The upper end 44 of the plunger 42 further comprises a recess or bowl 48 formed in an end face thereof. The base 49 of the bowl 48 extends below the close clearance annular portion 47.

In use, the plunger 42 is driven upwards during a pumping stroke of the pump 10 so as to reduce the volume of the compression chamber 16 and thus to pressurise fuel disposed therein. When the pressure of the fuel in the compression chamber 16 reaches a threshold value it is sufficient to cause the outlet valve 30 to open such that the pressurised fuel can be conveyed to the common rail accumulator.

In order to achieve the desired pressure in the compression chamber 16 during a pumping stroke, the compression chamber 16 must be substantially sealed so as to prevent or substantially eliminate egress of fuel from the compression chamber 16 other than via the outlet valve 30. To facilitate this, an annular seal 15 is provided on a lower face 13 of the main housing 12. The annular seal 15 encircles both the valve head 26 of the inlet valve 20 and an outlet port 32 which is in fluid communication with the outlet valve 30. The annular seal 15 has a cross section which tapers so as to define a relatively narrow annular contact surface at its extremity. Accordingly, when the plunger housing 14 is attached to the main housing 12, an upper face 18 of the plunger housing 14 abuts the annular seal 15. The tapered shape of the annular seal 15 serves to concentrate the contact force between the respective opposed faces of the main housing 12 and the plunger housing 14 over a small surface area to form a secure seal between them.

Sealing of the compression chamber 16 during a pumping stroke of the plunger 42 is also achieved by means of dilation of the upper end 44 of the plunger 42. During a pumping stroke of the plunger 42, the pressure of fuel in the compression chamber 16 increases as the volume of the compression chamber 16 reduces. As mentioned previously, the close clearance annular portion 47 of the plunger 42 is a close clearance fit with the adjacent wall of the plunger bore 40. The pressure in the plunger bore 40 below the close clearance annular portion 47 is maintained at substantially atmospheric pressure by means of a low pressure leak return path. Accordingly, there is a large pressure differential across the wall of the bowl 48 in the region below the close clearance annular portion 47. This pressure differential causes the bowl 48 to dilate radially which, in turn, moves the close clearance annular portion 47 closer to the adjacent wall of the plunger bore 40. Thus, although a small amount of fuel may escape past the close clearance annular portion 47 to the plunger bore 40 below, the dilation of the plunger 42 reduces any such leakage of fuel from the compression chamber 16.

A potential disadvantage of the arrangement described with reference to FIGS. 1 and 2 is that, when the plunger housing 14 is attached to the main housing 12, for example by threaded fastening means, it is possible that the forces applied to the upper face 18 of the plunger housing 14 in the vicinity of the annular seal 15 cause distortions to the plunger bore 40. Accordingly, this may lead to the plunger 42 sticking or seizing in the plunger bore 40 during operation of the pump. In particular, during normal operation, the upper end of the plunger bore 40 will typically dilate during a pumping stroke due to the high pressure in the compression chamber 16. However, as the pressure in the compression chamber 16 decays after a pumping stroke, both the bowl 48 of the plunger 42 and the adjacent wall of the plunger bore 40 will return to their static dimensions. When this happens, distortions to the upper end of the plunger bore 40 may cause the close clearance annular portion 47 of the plunger to stick or seize within it, preventing or impeding the movement of the plunger 42 on its return stroke.

A further disadvantage of the above described arrangement is that, in order to maintain the volumetric efficiency of the pump 10, it is necessary for the valve head 26 to be sized so as to occupy a substantial portion of the space within the bowl 48 of the plunger 42 when the plunger 42 is at the top of the pumping stroke. This is because the close clearance annular portion 47 of the plunger 42 must be disposed higher up the body of the plunger 42 than the base 49 of the bowl 48 in order to enable dilation of the bowl 48. However, increasing the depth of the bowl 48 necessarily increases the volume of the compression chamber 16 which reduces volumetric efficiency. Thus, in order to compensate, the volume of the valve head 26 is correspondingly increased so as to occupy sufficient volume within the compression chamber 16 so that the volumetric efficiency is preserved. However, increasing the size of the valve head 26 is not desirable because it increases the inertia of the valve member 22 and the greater mass of the valve member 22 may lead to increased wear of the valve seat 28 and an increased likelihood of cracking or failure of the valve member 22.

Figure 3:
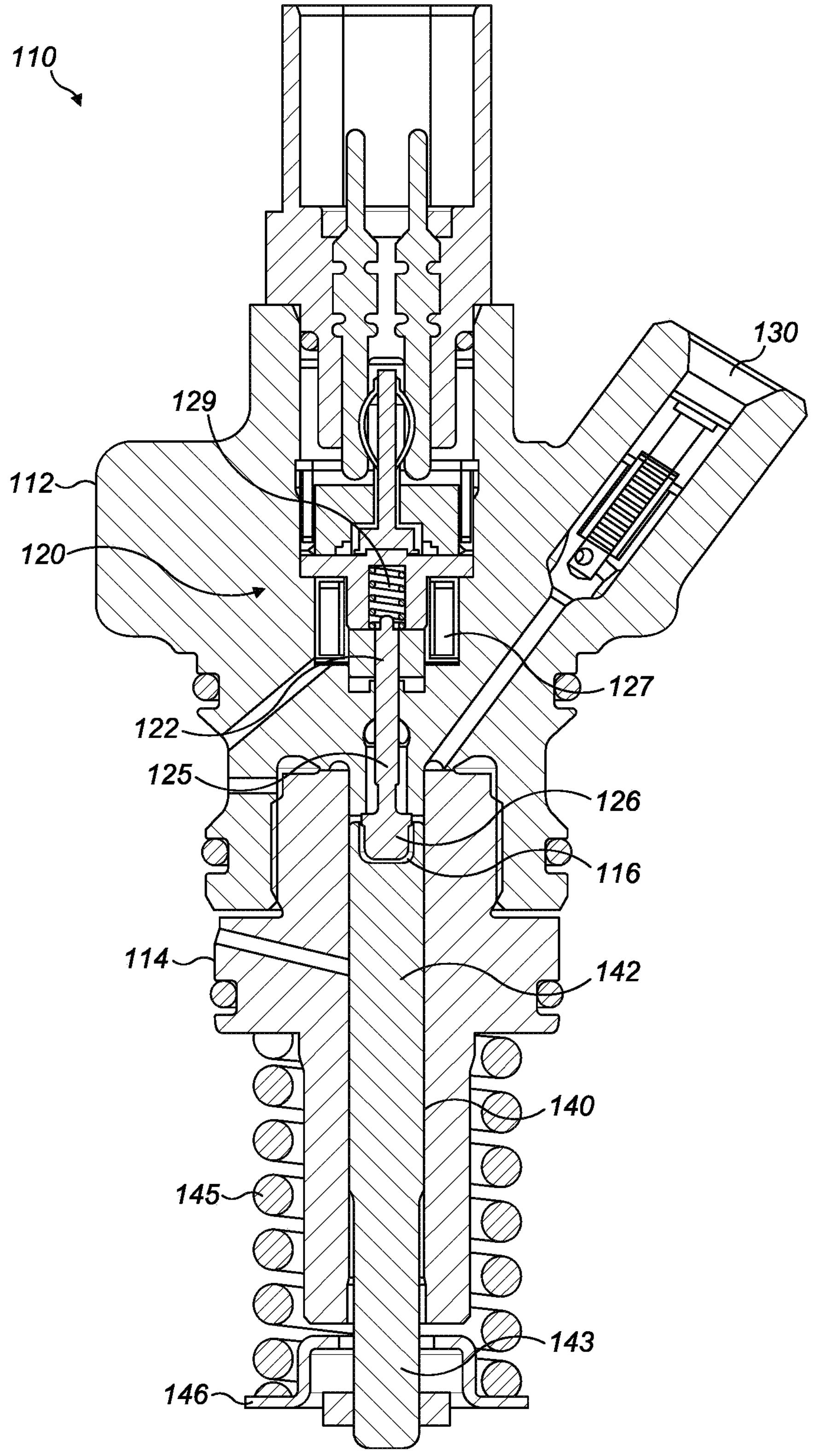
FIG. 3 is a cross-sectional view of a pump in accordance with an embodiment of the present invention.
Figure 4:
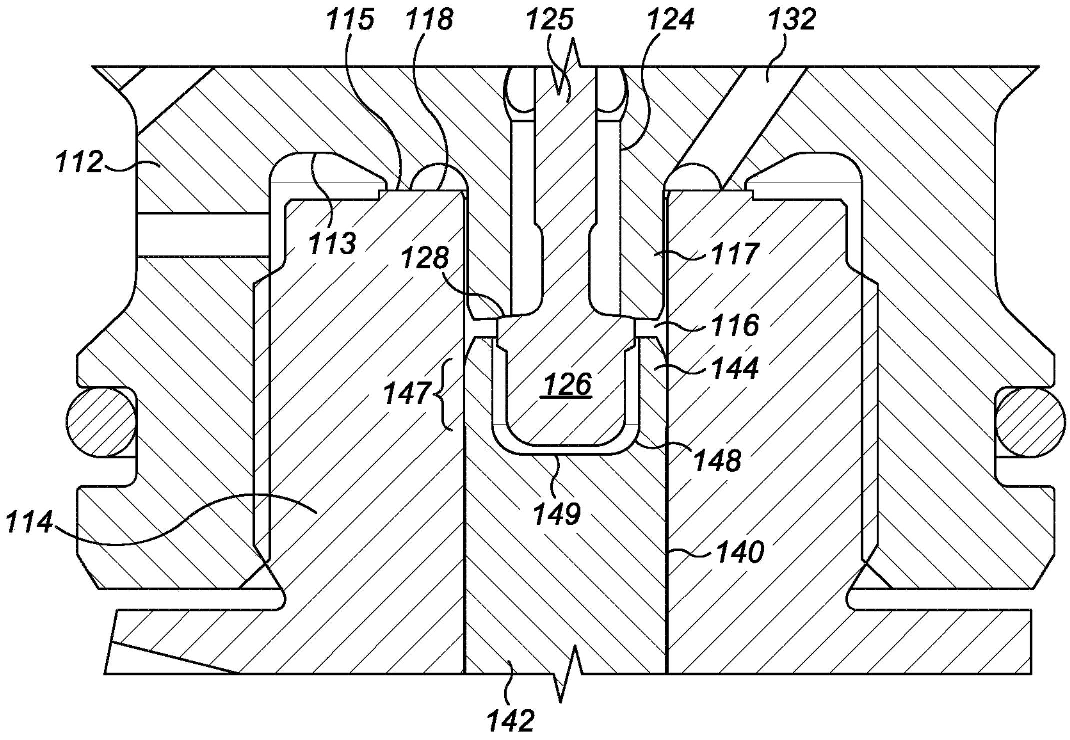
FIG. 4 is an enlarged cross-sectional view of a compression chamber of the pump shown in FIG. 3.

Referring to FIGS. 3 and 4 an embodiment of a pump 110 in accordance with the present invention will now be described. The pump 110 generally comprises a main housing 112 and a plunger housing 114. The plunger housing 114 is coupled to the main housing 112, for example by threaded fastening means, so as to define a compression chamber 116 therebetween.

The main housing 112 comprises an inlet valve 120 and an outlet valve 130. The inlet valve 120 controls the flow of fuel into the compression chamber 116. The outlet valve 130 allows pressurised fuel to be conveyed from the compression chamber 116 to downstream components of the fuel delivery system, such as a common rail accumulator (not shown).

In more detail, the inlet valve 120 comprises a valve member 122 arranged for reciprocating movement within a valve bore 124 defined by the main housing 112. The main housing 112 comprises a substantially cylindrical projecting portion or boss 117 on a lower face 113 thereof. The valve bore 124 extends though the projecting portion 117 and is co-axial therewith.

The valve member 122 comprises a valve stem 125 and a valve head 126. The valve head 126 projects into the compression chamber 116. The diameter of the valve head 126 is sized so as to be larger than the diameter of the valve bore 124 at a lower or distal end of the projecting portion 117 where it opens into the compression chamber 116. With this configuration, the lower opening of the valve bore 124 in the projecting portion 117 defines a valve seat 128. When the inlet valve 122 is in a closed state, the valve head 126 closes against the valve seat 128 so as to prevent the flow of fuel therepast. Movement of the inlet valve 122 is effected by means of an actuator 127 (e.g. a solenoid actuator) and a valve spring 129. The valve spring 129 is arranged so as to urge the valve head 126 away from the valve seat 128 toward an open position. When the pressure in the compression chamber 116 rises during a pumping stroke of the pump 110 this produces a force which acts against the valve spring 129. Closing of the inlet valve 120 can then be effected by energizing the solenoid actuator 127 to exert an additional closing force on the valve stem 125 which is sufficient to overcome the force of the valve spring 129 such that the valve head 126 closes against the valve seat 128.

The plunger housing 114 comprises an axial plunger bore 140 within which a plunger 142 is arranged for reciprocating movement therein. The plunger 142 is substantially cylindrical in shape. A lower end 143 of the plunger 142 is arranged, in use, to be in contact with an engine-driven cam (not shown). A plunger return spring 145 is disposed around the plunger housing 114. The return spring 145 abuts a shoulder of the plunger housing 114 at one end thereof and abuts a cap 146 affixed to the lower end 143 of the plunger 142 at the opposite end thereof.

The upper end 144 of the plunger 142 comprises a close clearance annular portion 147 having a larger diameter relative to the portion of the plunger 142 disposed immediately below the close clearance annular portion 147 in the axial direction of the plunger 142. The close clearance annular portion 147 is sized so as to be a close clearance fit with respect to the adjacent wall of the plunger bore 140. The upper end 144 of the plunger 142 further comprises a recess or bowl 148 formed in an end face thereof. The base 149 of the bowl 148 extends below the close clearance annular portion 47. Put another way, the close clearance annular portion 147 is disposed between the upper end 144 of the plunger 142 and the base 149 of the bowl 148 in the axial direction of the plunger 142.

An annular seal 115 is provided on a lower face 113 of the main housing 112. The annular seal 115 encircles both the projecting portion 117 of the main housing 112 and an outlet port 132 which is in fluid communication with the outlet valve 130. The annular seal 115 has a tapering cross section towards its contact with the plunger housing 114. Because the cross section tapers in this way, it defines a relatively narrow annular contact surface at its extremity. Accordingly, when the plunger housing 114 is attached to the main housing 112, an upper face 118 of the plunger housing 114 abuts the annular seal 115 and the tapered cross-section of the annular seal 115 serves to concentrate the contact force between the respective opposed faces of the main housing 112 and the plunger housing 114 over a small surface area, thereby forming a secure seal between them.

When the plunger housing 114 is coupled to the main housing 112, the projecting portion 117 of the main housing 112 and the valve head 126 of the inlet valve 120 are received within the upper end of the plunger bore 140. Accordingly, the projecting portion 117 occupies part of the volume of the compression chamber 116. The diameter of the projecting portion 117 is sized so as to be a clearance fit with the adjacent wall of the plunger bore 140 in order to provide a flow path for pressurised fuel out of the compression chamber 116 to the outlet port 132 during a pumping stroke of the pump 110.

With this arrangement it will be appreciated that, when the plunger 142 is at the top of the pumping stroke, the enlarged annular portion 147 of the plunger 142 is disposed lower in the plunger bore, with respect to the upper face 118 of the plunger housing 114, when compared to the arrangement described above with reference to FIGS. 1 and 2. This is because the uppermost portion of the plunger bore 140 is occupied by the projecting portion 117 of the main housing 112. Accordingly, in the presently described embodiment, the likelihood that the plunger 142 will become stuck or seized in the plunger bore 140 due to distortion of the of the plunger housing 114 in the vicinity of the upper end of the plunger bore 140 is reduced. This is because, when the plunger housing 114 is attached to the main housing 112 and the upper face 118 of the plunger housing 114 is compressed against the annular seal 115 of the main housing 112, any distortion caused to the upper end of the plunger bore 140 occurs in a region adjacent to the projecting portion 117 of the main housing 112, and not in the region of the close clearance annular portion 147 of the plunger (when it is at or close to the top of the pumping stroke).

A further advantage of the presently described embodiment is that the size of the valve head 126 is reduced compared to the arrangement described with reference to FIGS. 1 and 2. As described previously, in order to maintain a suitable volumetric efficiency of the pump 10, it is preferable for the compression chamber 16 to be sized so as to minimise the amount of fuel compressed in the compression chamber 16 over and above that which will be expelled at the desired pressure through the outlet valve 30. To this end, in the arrangement of FIGS. 1 and 2, the valve head 26 is sized so as to occupy at least some of the dead volume which is created by having a plunger 42 with a bowl 48.

In the presently described embodiment, the position of the close clearance annular portion 147 of the plunger 142 in the plunger bore 140 when the plunger 142 is at the top of the pumping stroke is lower with respect to the top of the plunger bore 140 than in the arrangement described with reference to FIGS. 1 and 2. This advantageously means that the close clearance annular portion 147 is further away from the part of the plunger bore 140 which is susceptible to distortions when the plunger 142 is at or close to the top of the pumping stroke. Moreover, with the presently described arrangement, because this displacement of the uppermost position of the close clearance annular portion 147 within the plunger bore 140 is achieved, in part, by virtue of the valve seat 128 being disposed within the plunger bore 140, this permits the close clearance annular portion 147 to be located closer to the upper end 144 of the plunger 142 itself. In turn, this means that the depth of the bowl 148 in the plunger 142 can be reduced, while still allowing for the base 149 of the bowl 148 to be below the lower extremity of the close clearance annular portion 147. By reducing the depth of the bowl 148, this allows fora corresponding reduction in the size of the valve head 126. Reduction of the volume of the valve head 126 may, advantageously, reduce wear of the valve seat 128 and reduce the likelihood of damage to components of the pump 110, e.g. fracturing of the valve member 122.

In an alternative embodiment, the inlet valve 120 may be a passive valve such that the actuator 127 is omitted. In this case, the valve spring may be arranged so as to urge the valve member toward a closed state, i.e. such that the valve head is biased toward the valve seat. With such an arrangement, the spring constant of the valve spring can be selected such that opening of the inlet valve against the force of the valve spring is effected by means of a vacuum created within the plunger bore as the plunger makes its return stroke. As the pressure differential across the valve head increases it will cause the valve head to lift away from the valve seat against the force of the valve spring thereby allowing fuel to flow into the compression chamber. This, in turn, reduces the difference in the pressure above and below the valve head until the pressure differential is no longer sufficient to hold the inlet valve open against the force of the valve spring.

It will be appreciated that various modifications may be made to the invention without departing from the scope of the invention as set out in the appended claims.

REFERENCES USED

10—pump
12—main housing
13—first face (of main housing)
14—plunger housing
15—annular seal
16—compression chamber
18—second face (of plunger housing)
20—inlet valve
22—(inlet) valve member
24—valve bore
25—valve stem
26—valve head
27—valve actuator
28—valve seat
29—valve spring
30—outlet valve
32—outlet port
40—plunger bore
42—plunger
43—lower end of plunger
44—upper end of plunger
45—plunger return spring
46—cap
47—close clearance annular portion (of the plunger)
48—plunger bowl (recess)
49—base of plunger bowl
110—pump
112—main housing
113—first face (of main housing)
114—plunger housing
115—annular seal
116—compression chamber
117—projecting portion (of main housing)
118—second face (of plunger housing)
120—inlet valve
122—(inlet) valve member
124—valve bore
125—valve stem
126—valve head
127—valve actuator
128—valve seat
129—valve spring
130—outlet valve
132—outlet port
140—plunger bore
142—plunger
143—lower end of plunger
144—upper end of plunger
145—plunger return spring
146—cap
147—close clearance annular portion (of the plunger)
148—plunger bowl (recess)
149—base of plunger bowl

The invention claimed is:

1. A pump for a fuel delivery system, the pump comprising:

a main housing and a plunger housing arranged to couple to the main housing so as to define a compression chamber therebetween, the main housing and the plunger housing comprising respective first and second opposed faces which are arranged to form a seal therebetween;

wherein the main housing comprises a projecting portion which projects from the first face of the main housing through an opening in the second face of the plunger housing into a plunger bore, and the projecting portion is sized so as to be a clearance fit with an adjacent wall of the plunger bore;

the main housing comprising an inlet valve for controlling a flow of fuel into the compression chamber, the inlet valve comprising a valve member arranged for reciprocating movement within a valve bore defined by the main housing, wherein the valve bore is formed, at least in part, in the projecting portion.

2. A pump according to claim 1, wherein the projecting portion comprises a valve seat disposed at a distal end thereof, the valve member comprising a valve head arranged to close against the valve seat when the inlet valve is in a closed state.

3. A pump according to claim 2, wherein the valve head projects away from the valve seat into the compression chamber.

4. A pump according to claim 3, comprising a plunger arranged for reciprocating movement within the plunger bore, wherein an end of the plunger proximal to the second face of the plunger housing comprises a recess therein, and wherein, in use, at least a portion of the valve head is received within the recess of the plunger during a pumping stroke of the plunger.

5. A pump according to claim 1, comprising a plunger arranged for reciprocating movement within the plunger bore.

6. A pump according to claim 5, wherein the plunger has a substantially cylindrical form and comprises a close clearance annular portion disposed toward an end of the plunger proximal to the second face of the plunger housing, wherein the close clearance annular portion serves to limit or substantially prevent fuel from leaking out of the compression chamber, in use.

7. A pump according to claim 6, wherein the end of the plunger proximal to the second face of the plunger housing comprises a recess therein.

8. A pump according to claim 7, wherein the close clearance annular portion of the plunger is disposed between said end of the plunger and a base of the recess.

9. A pump according to claim 1, wherein the projecting portion is a substantially cylindrical boss.

10. A pump according to claim 9, wherein the valve bore is co-axial with the substantially cylindrical boss.

11. A pump according to claim 1, wherein at least one of the first and second face comprises an annular seal which encircles the projecting portion.

12. A pump according to claim 11, wherein the annular seal is provided on the main housing and has a cross section which tapers towards contact with the plunger housing.

13. A pump according to claim 12, wherein the annular seal defines a relatively narrow annular contact surface at its extremity which contacts the plunger housing.

14. A pump according to claim 1, wherein the main housing and the plunger housing are coupled to one another by threaded fastening means.

15. A fuel delivery system comprising a pump according to claim 1.

* * * * *